(12) United States Patent
Abrahami et al.

(10) Patent No.: US 11,449,573 B2
(45) Date of Patent: Sep. 20, 2022

(54) SYSTEM AND METHOD FOR SMART INTERACTION BETWEEN WEBSITE COMPONENTS

(71) Applicant: Wix.com Ltd., Tel Aviv (IL)

(72) Inventors: Nadav Abrahami, Tel Aviv (IL); Barak Igal, Kfar Yehoshua (IL); Roni Ben-Aharon, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 150 days.

(21) Appl. No.: 16/002,356

(22) Filed: Jun. 7, 2018

(65) Prior Publication Data

US 2018/0293323 A1    Oct. 11, 2018

Related U.S. Application Data

(63) Continuation-in-part of application No. 15/661,342, filed on Jul. 27, 2017.
(Continued)

(51) Int. Cl.
| | | |
|---|---|---|
| *G06F 16/958* | (2019.01) | |
| *G06F 3/0484* | (2022.01) | |
| *G06N 20/00* | (2019.01) | |
| *G06F 16/80* | (2019.01) | |
| *G06F 15/76* | (2006.01) | |

(52) U.S. Cl.
CPC .......... *G06F 16/972* (2019.01); *G06F 3/0484* (2013.01); *G06F 15/76* (2013.01); *G06F 16/80* (2019.01); *G06F 16/958* (2019.01); *G06N 20/00* (2019.01)

(58) Field of Classification Search
CPC ...... G06F 16/972; G06F 16/23; G06F 16/951; G06F 40/103; G06F 40/131; G06F 40/137; G06F 40/186; G06F 16/658
See application file for complete search history.

(56) References Cited

U.S. PATENT DOCUMENTS 6,954,220 B1 * 10/2005 Bowman-Amuah ....................... G06F 21/6218
715/741
9,436,765 B2    9/2016 Abrahami
(Continued)

OTHER PUBLICATIONS

International Search Report for corresponding PCT application PCT/IB2018/05412 dated Nov. 27, 2018.

*Primary Examiner* — Vaishali Shah
(74) *Attorney, Agent, or Firm* — Heidi Brun Associates Ltd.

(57) ABSTRACT

A website building system includes at least one database storing website components and their associated component hierarchies, each component comprising overridable parameterized-behavior elements, non-overridable parameterized-behavior elements and a data handler, the data handler handling override protocols for the components; and an element handler to review all components to be rendered for a current view and for a current component, to handle a communication request between the current component and at least one other component within the component hierarchy in order to implement an override request from the at least one other component, the element handler to update the current component only if the override request is related to an overridable parameterized-behavior element of the current component according to the data handler of the current component.

19 Claims, 10 Drawing Sheets

Related U.S. Application Data

(60) Provisional application No. 62/531,897, filed on Jul. 13, 2017, provisional application No. 62/516,682, filed on Jun. 8, 2017, provisional application No. 62/367,151, filed on Jul. 27, 2016, provisional application No. 62/665,629, filed on May 2, 2018.

(56) References Cited

U.S. PATENT DOCUMENTS

| | | |
|---|---|---|
| 9,747,258 B2 | 8/2017 | Ben-Aharon |
| 9,753,911 B2 | 9/2017 | Goldstein |
| 2003/0004746 A1* | 1/2003 | Kheirolomoom ...... G06Q 10/10 717/104 |
| 2007/0136201 A1 | 6/2007 | Sah et al. |
| 2007/0162391 A1 | 7/2007 | Jain et al. |
| 2008/0010387 A1 | 1/2008 | Curtis et al. |
| 2010/0037258 A1 | 2/2010 | Chitturi et al. |
| 2010/0161394 A1 | 6/2010 | Bell et al. |
| 2011/0072416 A1* | 3/2011 | Hudson, Jr ............... G06F 8/36 717/122 |
| 2012/0078961 A1* | 3/2012 | Goenka ................ G06F 16/972 707/778 |
| 2013/0086496 A1 | 4/2013 | Baram |
| 2013/0219263 A1* | 8/2013 | Abrahami ........... G06F 16/9577 715/234 |
| 2013/0232403 A1 | 9/2013 | Abrahami |
| 2014/0282218 A1 | 9/2014 | Kaufman |
| 2016/0350422 A1 | 12/2016 | Abrahami |
| 2016/0357527 A1 | 12/2016 | Geva |
| 2017/0070842 A1* | 3/2017 | Kulp ..................... H04W 4/021 |
| 2017/0315969 A1 | 11/2017 | Ben-Aharon |

\* cited by examiner

SYSTEM AND METHOD FOR SMART INTERACTION BETWEEN WEBSITE COMPONENTS

CROSS REFERENCE TO RELATED APPLICATIONS

This application is a continuation-in-part application claiming benefit from U.S. patent application Ser. No. 15/661,342, filed 27 Jul. 2017 which claims priority from U.S. provisional patent applications 62/367,151, filed Jul. 27, 2016, and 62/531,897, filed Jul. 13, 2017, all of which are incorporated herein by reference. This application also claims priority and benefit from U.S. provisional patent applications 62/516,682, filed Jun. 8, 2017, and 62/665,629, filed May 2, 2018, both of which are incorporated herein by reference.

FIELD OF THE INVENTION

The present invention relates to website building systems generally and to smart containers and components in particular.

BACKGROUND OF THE INVENTION

Website building systems have become very popular and allow novice website builders to build professional looking and functioning websites. Many of these systems provide both the novice and experienced user ways of building websites from scratch.

Websites are typically made up of visually designed applications consisting of pages. Pages may be displayed separately and may contain components. A website building system may support hierarchical arrangements of components using atomic components (text, image, shape, video etc.) as well as various types of container components which contain other components (e.g. regular containers, single-page containers, multi-page containers, gallery containers etc.). The sub-pages contained inside a container component are referred to as mini-pages, and each of which may contain multiple components. Some container components may display just one of the mini-pages at a time, while others may display multiple mini-pages simultaneously. Reference is now made to FIG. 1 which illustrates a typical representation of a website building system 1 comprising a website 2 having webpages 3 which can be made up of components 4 further made up of atomic components 5 and container components 6. A container component 6 may be further comprised of various single page containers 7 and multi-page containers 8, further containing mini-pages 9. Other component types may include a semantic composite 11, a data/text repeater 12 and an image repeater 13.

Repeater containers (such as data/text repeater 12 and image repeater 13) may integrate information and data sources which are not related to the actual page editing process and component visual attributes. These data sources could be internal data lists or data from external sources, such as business or other information about the web site, its pages and the owner of the website (if available). This data is combined with component/layout information to form multiple instances of a repeating component inside the repeater container, which may possibly be automatically updated when the underlying data source changes. Such dynamic-content repeaters may also support overriding and other operations.

The components may be content-less or have internal content. An example of the first category is a star-shape component, which does not have any internal content (though it has color, size, position and some other parameters). An example of the second category is a text paragraph component, whose internal content includes the internal text, as well as font, formatting and layout information. This content may, of course, vary from one instance of the text paragraph component to another. Components which have content are often referred to as fields (e.g. a "text field").

Existing webpages are typically constructed from a combination of declarative HTML code (providing content and formatting), Cascading Style Sheets (CSS) providing additional styling and procedural JavaScript (JS) providing procedural underpinning for the page.

The content of the webpage may reside in a single file or a combination of files (e.g. HTML, CSS and JS files). A typical arrangement would be a main HTML file which includes additional HTML, CSS and JS files, with some of the included files common to multiple pages (e.g. a common set of styles or JS libraries used in multiple pages).

Such included files may originate from multiple sources. Some of the files may be created by the web page author, and some may come from a variety of pre-defined HTML, CSS or JS libraries or plug-in modules created by multiple authors.

Website pages may be statically defined, i.e. final form files of the pages are stored on a web server and accessed by the user though a browser (or other user agent software). Such web pages may be created manually, or through a system (e.g. web page editing or generation software) which creates the (static) web pages based on user definitions.

The website pages may also be dynamically generated, i.e. constructed dynamically (or semi-dynamically) when they are requested by the user. Such dynamic generation may be done via complete page generation. The entire page is created from predefined sub-elements with a separate definition of how these elements should be combined. An existing page template can be used with some placeholders filled with data in from other sources.

An on-line website building system may be used to create and deploy such dynamic pages. The page definitions may be created by a designer using the website building system, creating the page definitions using a variety of provided elements (such as components, containers, third party applications and page segments) assembled through a page creation environment.

The website building system typically saves the page definitions in a repository. These page definitions are read by the website building system during runtime and converted to web page information transferred to the site viewer. Then they are rendered for the current view, creating instances of the components.

The website building system may include client-side components such as JS application segments embedded into the generated pages and executed on the client or server side code included within the application.

The conversion of the website building system internal representation of the page definition into HTML/CSS/JS code (executable by the browser) may be divided in a number of ways between the elements of the website building system running on the server and the client. In one embodiment, the entire conversion work is done on a website building system server, which provides complete executable pages to the viewer's client machine. "Executable" in this context means pages which may be directly processed and rendered by the browser client.

In another embodiment, the website building system internal format definitions are the ones provided to the client (possibly extended with additional information), and the client-resident browser application performs conversion and dynamic page construction to create the browser-displayed page.

In yet another embodiment, the conversion work is divided between the server and the client, with each of them performing part of the conversion.

Such a client-side application may perform additional roles, such as handling of image galleries which allow operations (image moving/reordering etc.) to be done on the client side (engaging the server, for example, only to interface with the underlying database).

The processing and rendering may be performed in the context of a session between the server and the client. Such a session may be maintained by the server, e.g. to support an application viewing session.

A website building system may be extended using third party applications and their components as well list applications (as further described US Patent Publication No. 2014/0282218 entitled "DEVICE, SYSTEM, AND METHOD OF WEBSITE BUILDING BY UTILIZING DATA LISTS" published 18 Sep. 2014, incorporated herein by reference and assigned to the common assignee of the current invention).

Such third-party applications and list applications may be purchased (or otherwise acquired) through a number of distribution mechanisms, such as being pre-included in the website building system design environment, from an Application Store (integrated into the website building system or external to it) or directly from the third-party application vendor.

A website building system is typically offered by a website building system vendor. The website building system is used by users (also known as designers) who design the websites. The websites are then used by users-of-users (also known as end-users).

The third-party applications may be hosted on the website building system vendor's own servers, the third-party application vendor's server or on a $4^{th}$ party server infrastructure.

Existing systems typically allow editing to be performed at the component level including the container level. Thus, existing systems typically provide operations such as adding a component (e.g. by selecting a component from a menu of possible component types and using drag and drop), deleting a component, moving and resizing a component, changing component content, changing component attributes (e.g. through a floating or fixed attribute panel applicable to the component being edited) and placing components inside a container, or removing components from inside a container.

Existing systems may also allow components to be grouped (e.g. by using multiple selections of components together with a group/ungroup operation). The system may then allow operations to be performed on all components in a group such as move, resize or an attribute (e.g. color) change.

U.S. Patent Publication No. 2018/0032626 entitled "SYSTEM AND METHOD FOR IMPLEMENTING CONTAINERS WHICH EXTRACT AND APPLY SEMANTIC PAGE KNOWLEDGE", published on Feb. 1, 2018 incorporated herein by reference and assigned to the common assignee of the current invention, discusses how containers may also be comprised of sets of components that can form a semantic composite (such as semantic composite 11 in FIG. 1) as a result of an analysis of the components of a webpage known as a smart box. A smart box may provide a UI or interface which allows certain changes to be applied to multiple contained smart boxes (possibly at multiple levels of containment). The application discusses strict semantic composite matching (applying changes only to type conforming smart boxes) and soft matching (only applying changes whenever applicable to a given smart box). The changes may include style changes, the addition/removal of components, layout changes, decorative element changes etc. U.S. Patent Publication No. 2018/0032626 also discusses specialized editing behaviors to adapt component sets that have a specific functionality and requirements. Such a smart box container (defined based on page analysis) may also support overriding and other operations.

SUMMARY OF THE PRESENT INVENTION

There is provided in accordance with a preferred embodiment of the present invention, a website building system. The system includes at least one database storing website components and their associated component hierarchies, each component including overridable parameterized-behavior elements, non-overridable parameterized-behavior elements and a data handler, the data handler handling override protocols for the components; and an element handler to review all components to be rendered for a current view and for a current component, to handle a communication request between the current component and at least one other component within the component hierarchy in order to implement an override request from the at least one other component, the element handler to update the current component only if the override request is related to an overridable parameterized-behavior element of the current component according to the data handler of the current component.

Moreover, in accordance with a preferred embodiment of the present invention, the system also includes a runtime server to activate the element handler for the current component for the current view.

Further, in accordance with a preferred embodiment of the present invention, the system also includes WBS (website building system) editor with knowledge of parameterized behavior elements to enable a user to select a component and apply an editing change to the selected component.

Still further, in accordance with a preferred embodiment of the present invention, the current component is at least one of predefined, repeater and a semantic composite.

Additionally, in accordance with a preferred embodiment of the present invention, the system includes a page analyzer to determine the component hierarchy for the current component and to determine if the current component is a semantic composite.

Moreover, in accordance with a preferred embodiment of the present invention, the element handler includes a request receiver to receive the current component and the override request from at least one of: the WBS editor as a result of the editing change and the runtime server as a result of a change to the current component due to an external source; a component resolver to receive from the data handler of the current component which parameterized-behavior elements of the current component are overridable, to apply override request changes accordingly and to resolve override conflicts between the current component and the at least one other component within the hierarchy; and a negotiator to enable the communication between at least one parameterized-behavior element of the current component and the at least one other component according to the component resolver and a protocol based on pre-defined override rules for the at least one other component.

Further, in accordance with a preferred embodiment of the present invention, the element handler includes an artificial intelligence/machine learner to perform artificial intelligence and machine learning analysis based on user activity and analysis of other websites and pages to recommend modification overrides for the website components based on the analysis.

Still further, in accordance with a preferred embodiment of the present invention, the WBS editor includes a component editor to enable a user to create and define override rules for parameterized-behavior elements of a website component; a component selector to enable a user to select a component; and an editing behavior applier to apply the editing request to the selected component.

Additionally, in accordance with a preferred embodiment of the present invention, the editing request includes at least one of: selecting, dragging, dropping, resizing, copying, pasting and attribute modification.

Moreover, in accordance with a preferred embodiment of the present invention, the parameterized-behavior elements represent at least one of style, body and logic of the current component.

Further, in accordance with a preferred embodiment of the present invention, the override request is to an overridable parameter of a parameterized-behavior element.

Still further, in accordance with a preferred embodiment of the present invention, the website components also include at least one of: an editor behavior driver to affect the representation and editing process of a component by the WBS editor; a runtime behavior driver to affect how a component is handled by the runtime server at runtime; and a component rendering function to provide rendering instructions for the current component for the WBS editor and the runtime server.

There is provided in accordance with a preferred embodiment of the present invention, a method for a website building system, the method comprising storing website components and their associated component hierarchies, each component comprising overridable parameterized-behavior elements, non-overridable parameterized-behavior elements, and a data handler, the data handler handling override protocols for the components; and reviewing all components to be rendered for a current view and for a current component, handling a communication request between the current component and at least one other component within the component hierarchy in order to implement an override request from the at least one other component and updating the current component only if the override request is related to an overridable parameterized-behavior element of the current component according to the data handler of the current component.

Moreover, in accordance with a preferred embodiment of the present invention, the method also includes activating at runtime the reviewing, the handling and the updating for the current component for the current view.

Further, in accordance with a preferred embodiment of the present invention, the method includes enabling a user to select a component and apply an editing change to the selected component during an editing session.

Still further, in accordance with a preferred embodiment of the present invention, the current component is at least one of predefined, repeater and a semantic composite.

Additionally, in accordance with a preferred embodiment of the present invention, the method also includes determining the component hierarchy for the current component and determining if the current component is a semantic composite.

Moreover, in accordance with a preferred embodiment of the present invention, the reviewing, the handling and the updating includes receiving the current component and the override request from at least one of: the enabling a user as a result of the editing change and the activating at runtime as a result of a change to the current component due to a change from an external source; receiving from the data handler of the current component which parameterized-behavior elements of the current component are overridable, applying override request changes accordingly and resolving override conflicts between the current component and the at least one other component within the hierarchy; and enabling the communication between at least one parameterized-behavior element of the current component and the at least one other component according to the receiving, the applying and the resolving and a protocol based on predefined override rules for the at least one other component.

Further, in accordance with a preferred embodiment of the present invention, the reviewing, the handling and the updating also includes performing artificial intelligence and machine learning analysis based on user activity and analysis of other websites and pages and recommending modification overrides for the website components based on the analysis.

Still further, in accordance with a preferred embodiment of the present invention, the enabling a user to select a component and apply an editing change includes enabling a user to create and define override rules for parameterized-behavior elements of a website component; enabling a user to select a component; and applying the editing request to the selected component.

Additionally, in accordance with a preferred embodiment of the present invention the editing request includes at least one of: selecting, dragging, dropping, resizing, copying, pasting and attribute modification.

Moreover, in accordance with a preferred embodiment of the present invention the parameterized-behavior elements represent at least one of style, body and logic of the current component.

Further, in accordance with a preferred embodiment of the present invention override request is to an overridable parameter of a parameterized-behavior element.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
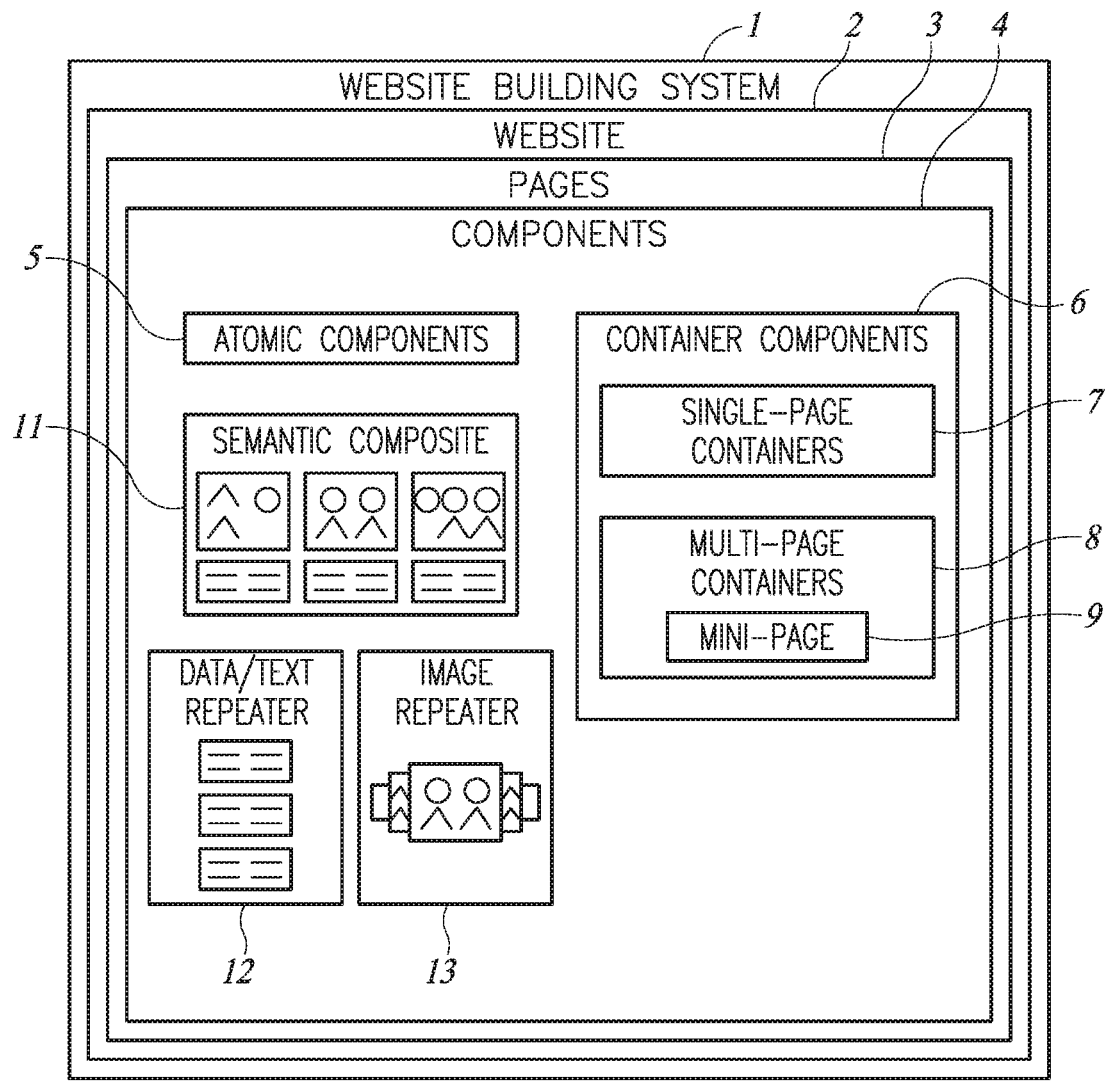
FIG. 1 is a schematic illustration of a typical representation of a website building system and pages created using the website building system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that the prior art systems do not allow for the complex behaviors and the complex component interactions often required to maintain the look and feel of a website which may constantly require updating based on internal (i.e. website designer or explicitly designed) and external factors. These updates (which may be specific at the component level) often require in depth knowledge of the use of the website building system itself in order to efficiently define and implement them easily and efficiently. Furthermore, website components (including external third party application components) may have behaviors applied to them which may affect other components within the same hierarchical arrangement across multiple hierarchical levels within the website building system environment.

It will be appreciated that a typical website building system may have three types of users: the component providers themselves, which could be part of the website building system vendor staff or separate component providers (e.g. via a component store or a third-party application store), the website designers themselves that use the components to build their site and the viewers or end users which use the finished site. It will also be appreciated that there may be some mixing between the classes. In particular, the website building system may allow designers (or some of them) to edit existing components or even to add their own new components e.g. allowing component collections defined by the site designer and to be saved as a component and be available to other site designers similar to those described in U.S. Patent Publication No. 2018/0032626 and US Patent Publication No. 2017/0046317 entitled "METHOD AND SYSTEM FOR SECTION-BASED EDITING OF A WEBSITE PAGE" published 16 Feb. 2017, now issued as US Pat. No. 10,146,419 on Dec. 4, 2018, incorporated herein by reference and assigned to the common assignee of the current invention.

Applicants have realized that the website building experience may be improved by a system which handles website components having parameterized-behavior elements within, which may define (for example) the operational and/or visual behavior of a component. The components may invoke a form of communication with other components using their parameterized-behavior elements and may be able to send and receive parameters as described in more detail herein below. For example, component A may notify component B to replace component B's parameterized-behavior element X with parameterized-behavior element Y. It will be appreciated that a given parameterized-behavior element may be pre-defined as being overridable or not in the context of a given component type or component instance (and not in others). Thus, due to the hierarchical nature of (for example) a web page (as shown in FIG. 1), operational changes made to a single current component, may also affect other components at all containment levels (and possibly not in the same sub-hierarchy of the affecting component) and vice versa. For example, containers may interact with the contained components within them at multiple levels, based on a protocol of pre-defined rules that allows both the container and the contained components to determine which attributes of the contained components may be affected (by the container) and in what ways. The logic for the protocol may include rules for "negotiable" overriding for parameterized-behavior elements together with an awareness of component relationships with other components/containers such as geometry, semantics, content, editing history etc. A contained component may also affect its container in the same manner. It will be appreciated that overriding may imply changing the attribute or parameter of a parameterized-behavior element or may imply a complete replacement of one or more parameterized-behavior elements as described in more detail herein below.

Applicant has further realized that the above-mentioned principles may be expanded to support containers which may provide Artificial Intelligence (AI) and Machine Learning (ML) based modification for a layout arrangement of contained components. Such a modification may include layout only (e.g. selecting position and size), limited attribute sets (e.g. a container may provide specific background images/video to the sub containers inside them, or just affect color selection etc.), behavior or any specific contained component behavior such as adding, removing, reordering contained components etc. In some embodiments this may apply to non-container components as well.

Applicant has also realized that use of the above mentioned parameterized-behavior elements may also improve the way webpage formatting is defined over the methods of the prior art such as Cascading Style Sheets (CSS). Existing CSS-based systems collect rules from multiple style sheets (as provided by the browser, the user and the site itself) and match these rules to elements in the site, thereby affecting the element's style or behavior. The matching is based on the selectors provided with each rule, which are typically based on HTML element type (e.g. DIV), class, ID or a combination thereof. The prior art systems may also have components with default behavior and the option to override them, but not by using parameterized-behavior elements. Elements may have implicit (default) styles or behaviors. For example, a DIV is implicitly a box which extends to 100% of available space of its parent element.

Applicant has further realized that the use of parameterized-behavior elements allows for implementing a style across a web page with the additional functionality of the ability for components to specify who may affect them or not (e.g. "only a gallery may modify my size"). In particular, this specification may be based on a component analysis involving (for example) component content, geometry, types, semantic types, editing history, business information (BI) and inter-component relationships. Such an analysis may provide additional component classification and association information (which was not explicitly provided by the designer), and this information may be used to determine the applicability of styles (or other attributes) to the analyzed components. For example, "apply red bevels to all detected pairs of picture and caption inside the container", where the caption and picture pairs are detected (rather than being predefined) through a component analysis as described in U.S. Patent Publication No. 2018/0032626.

Figure 2:
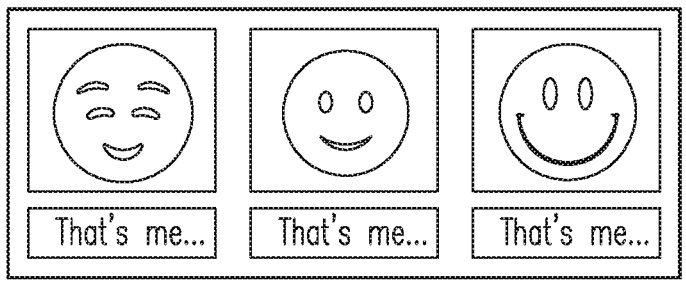
FIG. 2 is a schematic illustration of the application of parameterized behavior elements on semantic composites, constructed and operative in accordance with the present invention.
Figure 2:
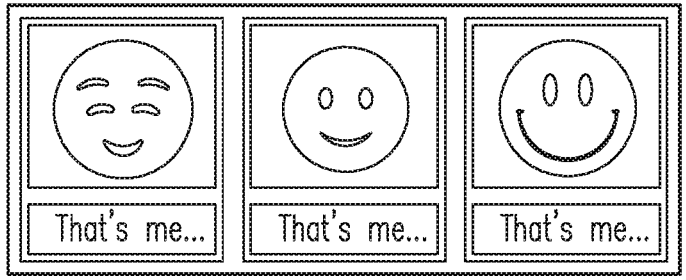
Figure 2:
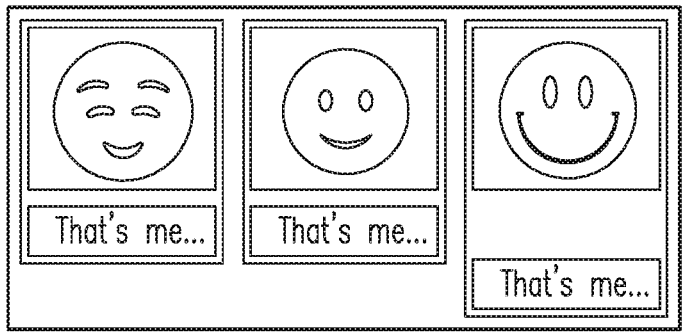
Figure 2:
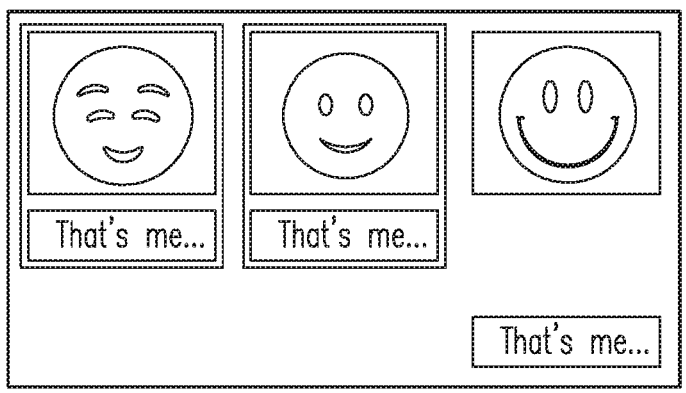
Figure 2:
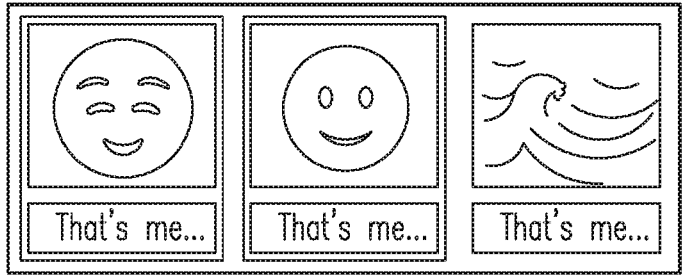

Reference is now made to FIG. 2 which illustrates this detection and classification. Row 1 shows 6 unrelated objects, 3 smiley faces and 3 captions. Row 2 shows how the system may recognize pairs of smiley face and caption (as a semantic composite) and may apply a frame around each face/caption pair according to an instruction. Row 3 shows how even if the user moves the caption of the right-most "pair" the distance between them is still within the definition of a face/caption pair and therefore the frame still applies. Reference is now made to row 4 which shows how when the caption is moved outside the requirements of the semantic composite definition (and is now no longer recognized as a face/caption pair semantic composite), there is no longer a frame around this pair. In row 5, the right-most picture has changed and the system does not recognize it as being a smiley face and therefore draws no frame. It will be appreciated that this functionality is not applicable to regular CSS since it cannot identify pairs of face image and a caption.

Applicant has also realized that this use allows containing components to affect multiple levels (containing components nested within component containers etc.) and as a result, applied component modifications may be "deep". For example, "make all contained video players appear without a rewind button at all containment levels" or "apply a video background with video X to all contained sub-containers" etc.

It will be appreciated that website components in general are highly configurable and may have their attributes and operations affected from both internal and external sources (such as components that are outside the regular site hierarchy and may not be visible in the site) to the website building system they are associated with. For example, services that adapt specific site components to the time of day and season of the year. A list of contained components (in a given container of page) may be pre-defined or dynamically determined and may be used in multiple different scenarios such as a website building system scenario in which components are pre-specified with accessible attributes or in a non-website building system scenario in which analysis is performed on a given website page to determine the division of the page into components and containers and their attributes.

It will be appreciated that a website component definition typically includes three main sub-entities: the style, body and logic elements (and additional elements as discussed in more detail herein below). The style of a component may be defined using any style definition language, or an extended version thereof. The body of a component may be defined using any standard content definition language (such as HTML, XML or JSON), or using a proprietary or non-standard language (such as JSX).

The logic of a component may be defined using any procedural language, such as JavaScript, TypeScript or any regular programming language which allows the use of native code elements in websites. Alternatively, it may be defined through a specialized browser, browser add-on or mobile app if the pertinent website building system at runtime is implemented using a native client. It contains the business/operational logic of the component. The logic definition language may also include various language extensions to the underlying language (e.g. an E-JS language extending the regular JavaScript language).

It will be appreciated that these elements (which are part of the component definition) may be referenced (jointly) as the SBL (Style/Body/Logic) elements of the component. Such component definitions may be built outside the system using regular tools available to developers (such as editors). Alternatively, the system may provide a component editing environment (which may or may not be integrated with the editor). Such a component editing environment may only be available to the staff of the website building system vendor. Alternatively, the component editing environment may be made available to external component developers, or to site designers (enabling them to define their own components).

The component definition may also include additional information such as multiple configurations and variants to be used under different conditions and an editing driver and additional editing-related information (such as dynamic layout hints) which may be used by the system editor to support editing the instances of the specific component inside the web page. The additional information may also include a component rendering function for use during both editing preview and runtime for a current view as described in more detail herein below.

It will be appreciated that website pages may be built using a hierarchy of component instances which may include additional information beside the component definition reference (such as the content, hierarchy position, screen position, size, various layouts, meta-data of the component and other attributes).

Figure 3:
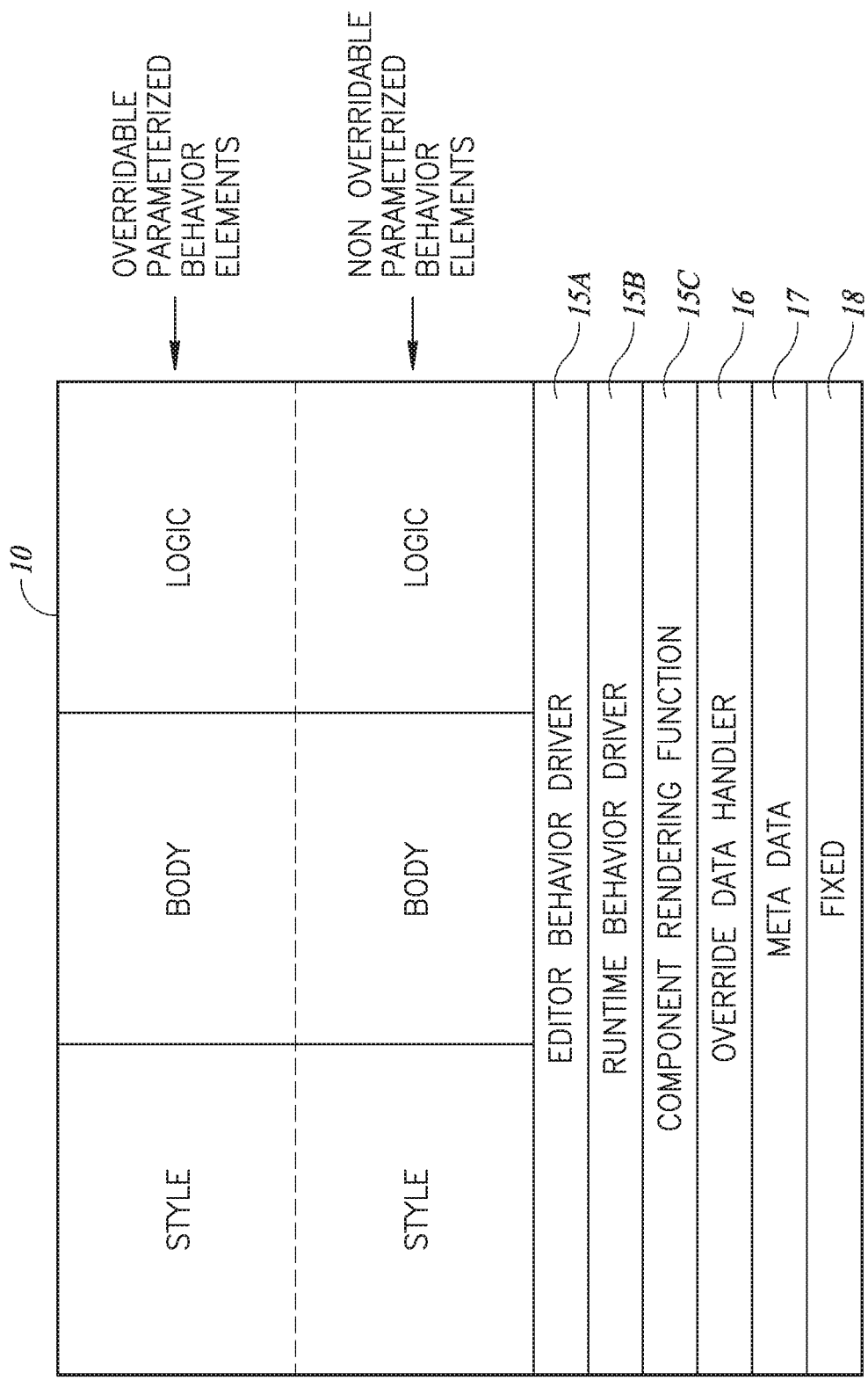
FIG. 3 is a schematic illustration of an extended component, constructed and operative in accordance with the present invention.

Reference is now made to FIG. 3 which illustrates an exemplary extended component 10 definition, according to an embodiment of the present invention. It will be appreciated that extended component 10 may enable smart interaction between related components by communicating style, behavioral and operational changes via its included parameterized-behavior elements. Extended component 10 may have an extended or additional structure beyond that of a regular website component of the prior art. It will be appreciated the definition of an extended component may include style, body and logic elements as described herein above, but may also include parameterized-behavior elements which may or may not permit overrides according to pre-defined rules and protocol resolution as described in more detail herein below.

Extended component 10 may also comprise an editor behavior driver 15A, a runtime behavior driver 15B, a component rendering function 15C, an override data handler 16, metadata 17 and a fixed area 18.

Editor behavior driver 15A may affect the way the component and its contained components are handled by the editor in use (such as providing dynamic layout hints).

Runtime behavior driver 15B may affect the way the component and its contained components are handled during runtime. Component rendering function 15C may provide rendering instructions during both editing preview and runtime. For example, input components may use a quick-response renderer so as to provide helpful feedback to the user of the website building system.

Component rendering function 15C may typically be coordinated with the main rendering process of the website building system and may affect (depending on the website building system implementation) any part of the website building system display process. For example, for website building systems which display the page though a browser, component rendering function 15C may affect both the conversion of the stored pages into HTML/CSS/JS and the rendering of the generated HTML/CSS/JS in the browser.

Override data handler 16 may communicate information regarding the above mentioned pre-defined rules and protocol resolution for the component, i.e. what the overriding conditions are. Metadata 17 may also include component meta-data (such as creator information and internal reference ID). Fixed area 18 contains elements of the component which cannot be overridden, such as the area in the component in which the content will be stored in each component instance.

It will be appreciated that a parameterized-behavior element may be compared to a function parameter in a regular programming language. Thus, a single extended component 10 may contain multiple parameterized-behavior elements, each having different types and each affecting (when authorized to do so) different parts of extended component 10. For example, a style parameterized-behavior element type may handle style, a layout parameterized-behavior element type may handle layout etc. It will also be appreciated that a parameterized-behavior element may not necessarily conform to a standard SBL classification and may also override multiple SBL elements as well as other elements.

It will be appreciated that for the sake of the discussion below, references to website components refer to extended components 10 as described herein above.

A layout parameterized-behavior element may define the way in which internal (sub) components of the component are arranged, e.g. a slider gallery vs. a grid gallery vs. Vbox. A style parameterized-behavior element may define the visual parameters used by the component or its sub-elements.

Thus, for example, a page designer may embed a desired grid gallery component but override its internal behavior to arrange the gallery's content using a slider arrangement (by providing a slider layout parameterized-behavior element as part of the grid-based gallery).

It will also be appreciated that some parameterized-behavior element types (such as a layout parameterized-behavior element) may also function as standalone components, i.e. without being applied to another component. Thus, a grid layout parameterized-behavior element may function (by itself) as a simple grid component.

A component may also support the inclusion of multiple parameterized-behavior elements which together with the component definition form a complete component. For example, a button component may support the inclusion of a background parameterized-behavior element and a layout parameterized-behavior element. The button component by itself may provide the basic framework for the button (such as a providing a displayed object which has "pressed" and "un-pressed" configurations and associated "I was pressed" event trigger). The two included parameterized-behavior elements may provide a background for the button and a display layout for elements written on the button.

These two parameterized-behavior elements could be, for example, a video background parameterized-behavior element (which displays a video background for the button), and an Hbox (horizontal box) type layout parameterized-behavior element (which displays the button surface elements such as a label and a small icon, horizontally next to each other).

It will be appreciated (for the above example) that the parameterized-behavior elements are not specific to the button component. The same video background parameterized-behavior element and Hbox type layout parameterized-behavior element may be used with other component types (such as forms or containers), separately or together. Furthermore, parameterized-behavior element invocations may be part of the component instance (and not its definition), so that one button may use (for example) a video background parameterized-behavior element and another button may use an image background parameterized-behavior element.

It will also be appreciated that the parameterized-behavior elements used in the component may use the component's own properties and parameters and may also use specific properties and parameters provided for a specific invocation of the parameterized-behavior element as part of the host or parent component's instance definition. A component may also use multiple parameterized-behavior elements of the same type for different parts of the component. For example, a two-column component may use one layout parameterized-behavior element (such as Vbox) for the $1^{st}$ column, and a second layout parameterized-behavior element (such as Hbox) for the $2^{nd}$ column.

It will be appreciated that a parent component instance which includes the child component instance may modify the child component instance through the application of parameterized-behavior elements as described in more detail herein below (and vice versa). A single component may be modified by multiple parameterized-behavior element types affecting various elements of the component display and functionality. Such parameterized-behavior element types may affect any of the SBL sub-entities of the component, i.e. its style, body and logic. Different parameterized-behavior elements typically (but not always) affect different aspects of the component, and thus the order in which the multiple parameterized-behavior elements are "applied" to the component may be relevant or not relevant according to the situation. A single parameterized-behavior element may affect multiple SBL sub-entities of the component, e.g. affect both the style and body of the component. The actual parameterized-behavior element applying may be performed during the rendering process. The system implementing the parameterized-behavior element may perform preprocessing while invoking the component or the page publishing (to save on follow-up processing).

As discussed herein above, one type of parameterized-behavior element type is layout which controls the layout (position and possibly size) used for the component's sub-elements such as the above mentioned Hbox (horizontal box) layout parameterized-behavior element, which displays the internal elements along a horizontal line.

Another example is the application of a matrix gallery layout parameterized-behavior element to a generic gallery component. The created matrix gallery component would display its internal elements in a matrix of rows and columns, possibly with scrolling to show more elements than the basic matrix sizes allow.

Yet another example would be a user-moveable layout parameterized-behavior element, which would place the internal elements in a given initial position order but allows the end user of the application to move the elements around inside the container during runtime (as specified by the container runtime behavior handler 15B).

As discussed herein above, another type of parameterized-behavior element type is style, which controls the elements of visual presentation of the component (such as the component's color, margins, etc.).

A style parameterized-behavior element type may for example, be used for background replacement. A sophisticated video player component may include multiple customizable buttons and control areas. A style parameterized-behavior element type may then be used to replace the buttons and control area background colors and patterns, in order to create a personalized version of the video player components.

A style parameterized-behavior element type may also affect other (non-layout) parameters of the contained components. This may be different from a parameterized-behavior element which affects the presentation of the component itself (rather than its contained components).

As discussed herein above, a component definition may consist of multiple sub-elements (representing style, body and logic and additional elements). As part of the component instance definition inside an application, some of these elements may be overridden by parameterized-behavior elements (subject to appropriate rule negotiation). These replacement parameterized-behavior elements may themselves have parameters which govern their behavior or functionality. Such parameters may be required (i.e. the parameterized-behavior element will not function if they are not provided), or alternatively the parameterized-behavior element may provide defaults for their values.

For example, a button component may allow the specification of a style parameterized-behavior element controlling the button shape. A specific style parameterized-behavior element may provide an ellipse-like shape, and may receive parameters which specify the vertical and horizontal diameters of the ellipse. The button instance may invoke this ellipse parameterized-behavior element and may provide the specific parameter values (such as 100 pixels for the vertical diameter and 200 pixels for the horizontal diameter).

Figure 4:
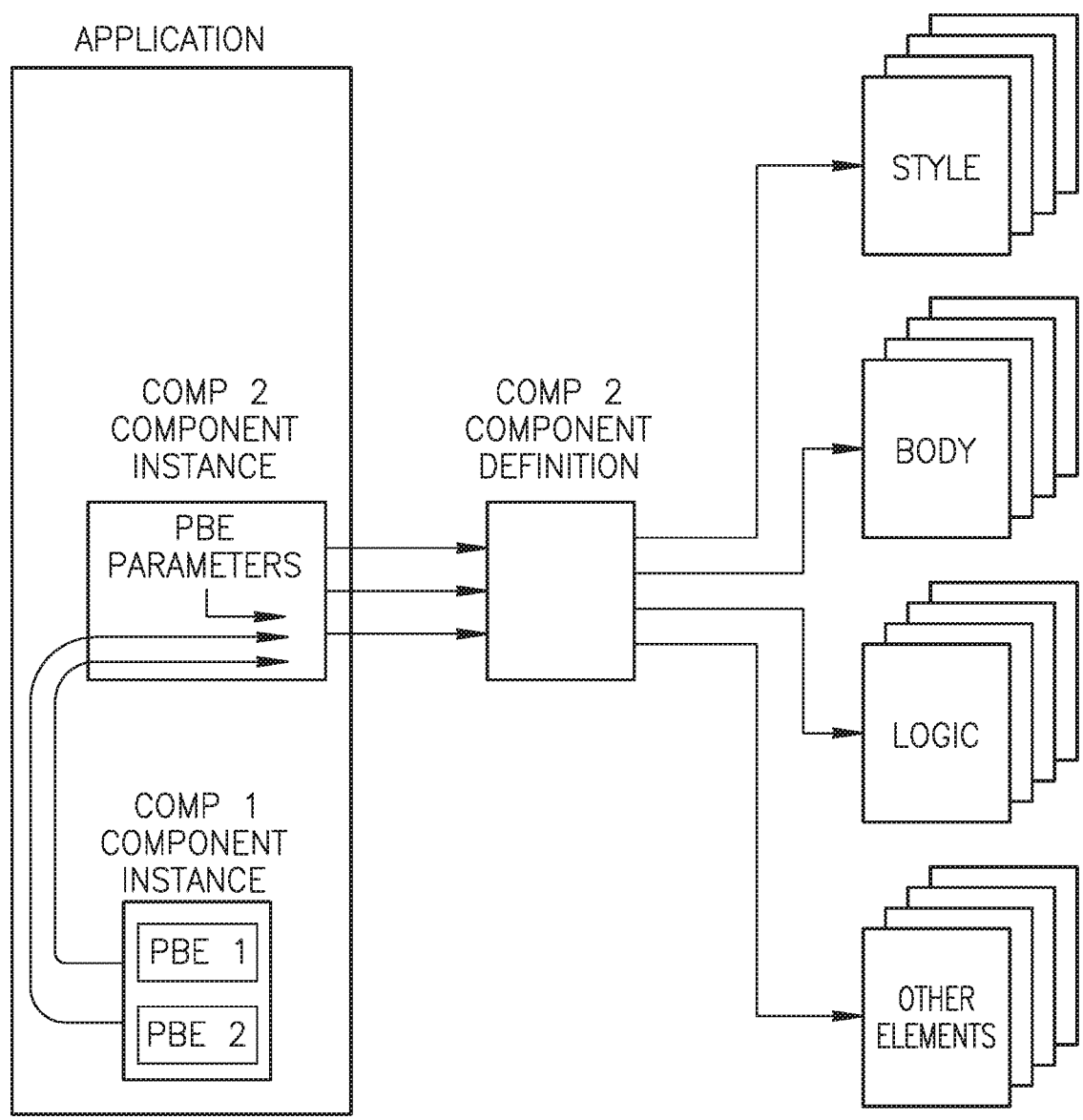
FIG. 4 is a schematic illustration of the relationship between two components using parameterized behavior elements, constructed and operative in accordance with the present invention.

Reference is now made to FIG. 4 which illustrates the relationship between two components inside an application. As can be seen, the instance of comp 2 within the application requires parameterized-behavior elements for its component definition from other components (in this scenario comp 1), as well as specific parameters for these parameterized-behavior elements. In turn, these parameterized-behavior elements and parameters may affect the style, body, logic and other elements of the component.

As is illustrated in FIG. 4, a single component may accept multiple parameterized-behavior parameters from other components. This may be via a negotiating element (as described in more detail herein below). Such multiple parameterized-behavior elements may have different or cumulative effects. For example, a gallery component may allow the use of two style parameterized-behavior elements: one to affect the gallery frame background area and one to affect the sub-components managed by the gallery.

It will be appreciated that a component may also accept from another component, other (non-parameterized-behavior elements) complex or composite parameters, e.g. parameters based on aggregate types (such as lists, structures and unions).

It will also be appreciated that in embodiments which use web-like languages (i.e. E-HTML/CSS/JS) to define pages or components, a parameterized-behavior element may also be specified for a component using an invocation parameter/attribute (as described in more detail herein below), or through a style sheet with an added rule for the specific parameterized-behavior elements type e.g.:

```
<panel layout="{Carousel}"> ... </panel> // Specify layout through
                                         // an invocation parameter
Or:
.xyz {
--layout: Carousel;
}
<panel class="xyz"> ... </panel>  // Specify layout through a CSS class
```

It will be appreciated that a parameterized-behavior element type (such as a layout parameterized-behavior element) in general has limited/specific functionality. It may only handle the physical layout of contained components in a gallery (e.g. providing a matrix/slider carousel arrangement), and thus would typically not include the full SBL specification. However, a parameterized-behavior element may include specific additional attributes. For example, a specific matrix layout parameterized-behavior element type may also include some visual attributes (e.g. apply a yellow background to some sub-components of the hosting component). However, the typical definition of a layout parameterized-behavior element type focuses on the sub-component arrangement and would typically not include additional attributes and properties.

It will also be appreciated that parameterized-behavior elements are typically created through the component editing facility of the website building system (as described in more detail herein below) or potentially by a dedicated parameterized-behavior element-specific editor.

Thus, an extended component may comprise parameterized-behavior elements including information about layout, configurations, editor driving, rendering processes and runtime behavior of the component in addition to its standard style, body and logic. An extended component may accept parameters from other related components (via their parameterized-behavior elements) which may specify, add or modify any of the SBL elements or parts thereof.

Figure 5:
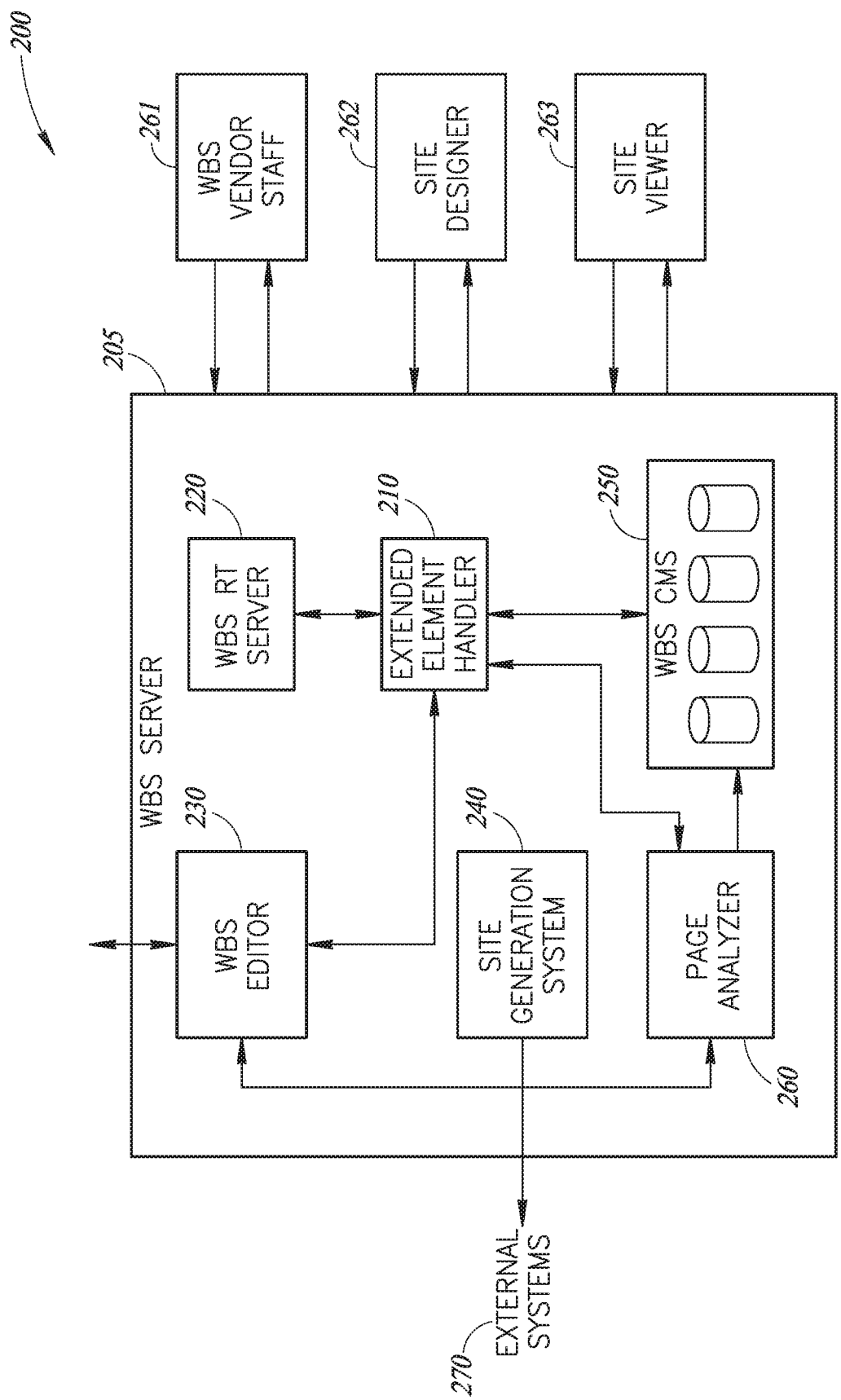
FIG. 5 is a schematic illustration of a system for the smart interaction between website components and containers, constructed and operative in accordance with the present invention.

Reference is now made to FIG. 5 which illustrates a system 200 for the smart interaction between website components and containers according to an embodiment of the present invention.

System 200 may comprise a website building system 205, an extended element handler 210, a WBS (website building system) runtime server 220, a WBS (website building system) editor 230, a site generation system 240, a content management system 250 and a page analyzer 260. Website building system 205 may be in communication with client systems operated by website building system vendor staff 261, a site designer 262, a site viewer 263 and with external systems 270.

It will be appreciated that system 200 and the functioning of its elements may be similar to that of system 100 as described in U.S. Patent Publication No. 2018/0032626.

It will be further appreciated that the work flow of system 200 may have 3 stages. The first stage may be component definition, the second stage may be page definition and the third stage page resolution via a preview process using WBS 230 and as part of the runtime process performed by WBS runtime server 220 as described in U.S. Patent Publication No. 2018/0032626.

Figure 6:
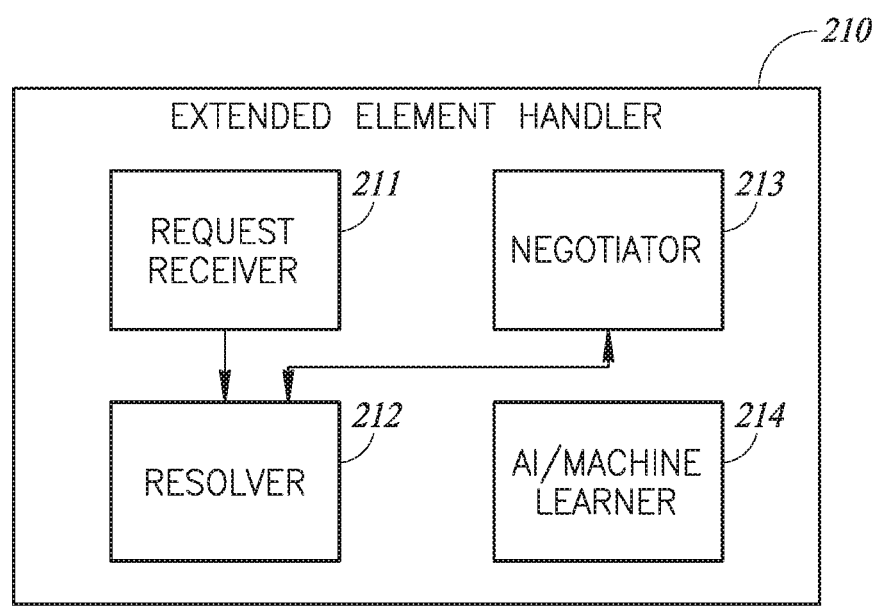
FIG. 6 is a schematic illustration of the elements of the extended element handler of FIG. 5, constructed and operative in accordance with the present invention.

Extended element handler 210 may handle the communication between related website components regarding their parameterized-behavior elements. Reference is now made to FIG. 6 which illustrates the elements of extended element handler 210. Extended element handler 210 may comprise a request receiver 211, a resolver 212, a negotiator 213 and an AI/Machine learner 214 which may incorporate AI and machine learning principles as discussed in more detail herein below.

Figure 7:
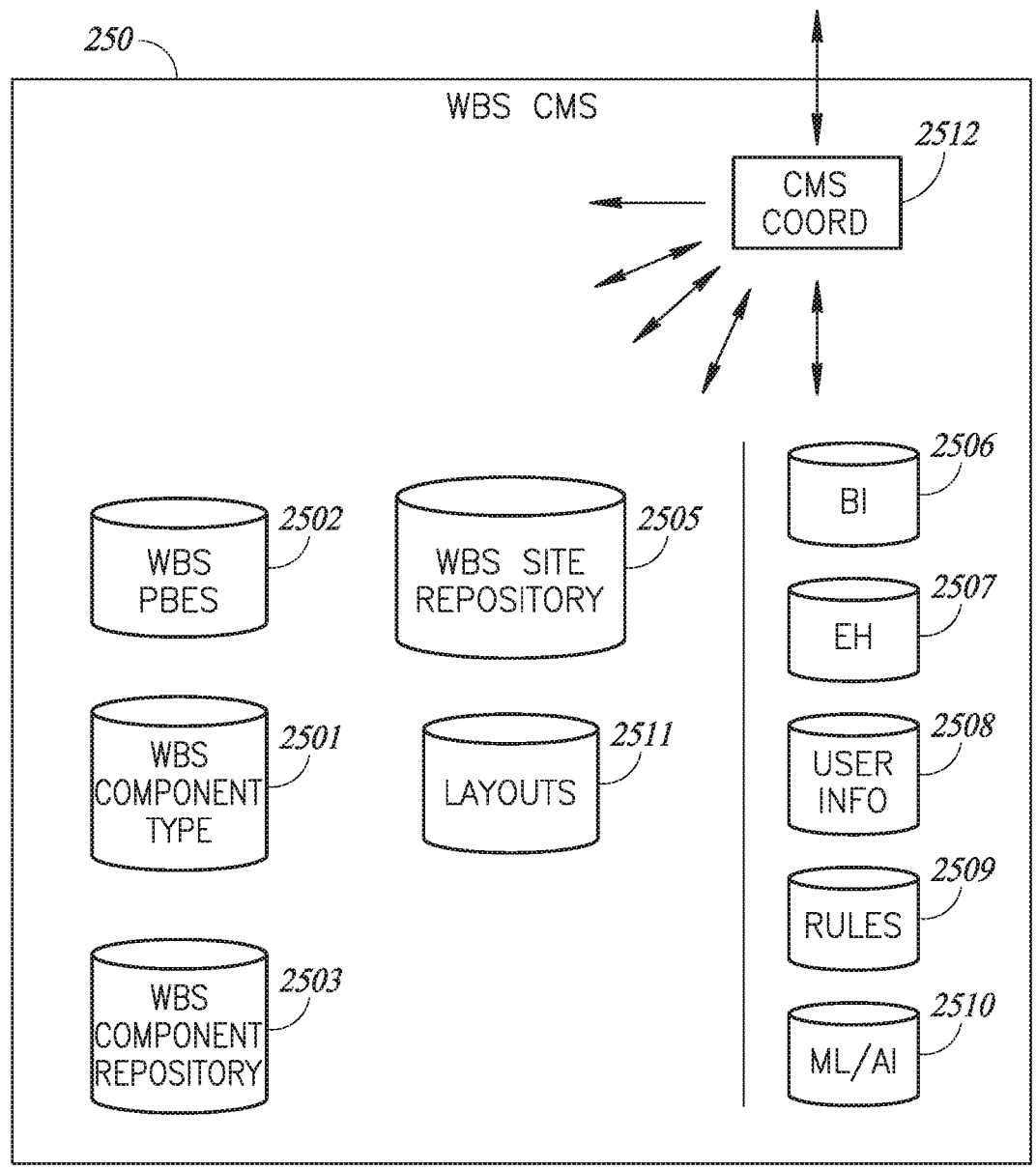
FIG. 7 is a schematic illustration of the elements of the content management system of FIG. 5, constructed and operative in accordance with the present invention.

CMS (content management system) 250 may hold all forms of content and layout pertinent to website building system 205 as is illustrated in FIG. 7 to which reference is now made. Content management system 250 may comprise website component types repository 2501, website parameterized-behavior elements repository 2502, a WBS (website building system) component repository 2503, a WBS site repository 2505, a business intelligence repository 2506, an editing history repository 2507, a user information repository 2508, a rules repository 2509, a ML/AI (machine learning/artificial intelligence) repository 2510, a layouts repository 2511 and a content management system coordinator 2512 to coordinate data between content management system 250 and system 200. It will be appreciated that the setup and functioning of CMS 250 may be similar to that of CMS 50 in U.S. Publication No. US 2018/0032626.

Page analyzer 260 may pre-process and analyze an incoming webpage to determine data structures and relationships between them as is described in relation to page analyzer 44 in U.S. Pat. No. 9,747,258 entitled "SYSTEM AND METHOD FOR THE CREATION AND USE OF VISUALLY-DIVERSE HIGH-QUALITY DYNAMIC LAYOUTS" issued Aug. 29, 2017 and assigned to the common assignee of the present invention. It will be appreciated that in this manner, page analyzer 260 may identify semantic composites, repeater components and general component hierarchies.

Figure 8:
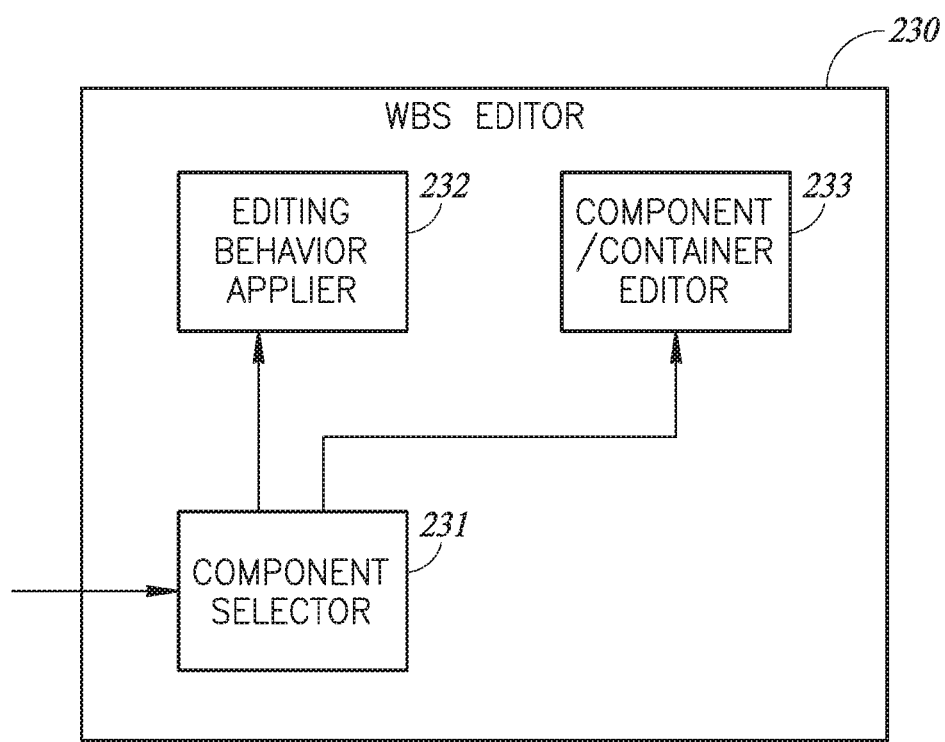
FIG. 8 is a schematic illustration of the elements of the WBS editor of FIG. 5, constructed and operative in accordance with the present invention.

WBS editor 230 may be a regular website building system visual editor with an understanding of how to handle parameterized-behavior elements, and the ability for extended components to provide specialized editing behaviors. WBS editor 230 may also have a good understanding of the data structure of the page being edited. WBS editor 230 may allow vendor staff 261 and/or designers 262 to interactively edit/create website pages as described in more detail herein below. Reference is now made to FIG. 8 which illustrates the elements of WBS editor 230. WBS editor 230 may comprise a component selector 231, an editing behavior applier 232 and a component/container editor 233.

WBS editor 230 may include a visual editing stage, a set of component selection panels, and also visual property editors which include multiple properties (layout or non-layout related) for each component or container. The visual property editors may be displayed through a property sheet presenter. WBS editor 230 may access the set of available components (as provided by the website building system vendor (from CMS 250) as well as third party component providers) and use information from these components in the page editing environment.

One such use would be the use of the metadata 17 of the component (e.g. component name, description, type and origin) as well as SBL information and SBL interface definitions to create an interface which allows the selection of components to include in a page. It will be appreciated that component selector 231 may further implement an interface for each of the selected component's SBL elements, e.g. providing a style selection UI displaying styles relevant to the page's set of components or a selected subset thereof.

Another such use would be for components to provide their matching customization/configuration/property editing UI, which would be included by WBS editor 230 and may allow website designers 262 to customize the specific component instance. This could be done in a number of ways.

Components may provide a full configuration UI (user interface), i.e. the component definition may include the configuration UI used in WBS editor 230 to configure the component. This could be full UI code (e.g. a UI displayable using a separate iFrame) or a set of parameters provided to WBS editor 230 which generates and presents the actual configuration UI.

Such a configuration UI may take the form of an alternate component version used to edit the component's aspects and attributes in-place, providing editing capabilities and a UI in the same place occupied by the component. The component may also provide multiple such versions, used to edit different aspects or attributes of the component.

It will be appreciated that components may provide a set of customization properties and associated information (known as customization records). WBS editor 230 may then create customization dialogs by collecting these customization records, integrating records from multiple components if needed, and generating the customization UI. Such capability is further discussed in U.S. Pat. No. 9,753,911 entitled "SYSTEM AND METHOD FOR DIALOG CUSTOMIZATION" issued 5 Sep. 2017, incorporated herein by reference and assigned to the common assignee of the current invention. It will be appreciated that overriding parameter-behavior elements may also override these customization records to provide an alternative customization interface.

It will also be appreciated that components may include additional non-configuration information that may be useful to WBS editor 230. Such information may be internal to the component and may affect the content of the component or affected components placed inside the component (e.g. as discussed in more detail herein below in relation to smart containers). The information may also be external to the component and may affect the way WBS editor 230 and containing components interact with the given component (e.g. specific guidelines on how the component may be dragged or resized).

As another example, the component may provide alternative component versions or configurations. An example would be providing a simplified or light-weight version of the component and in this scenario, system 200 may display a (partially) "live" component while dragging or zooming the component (as opposed to the component display when the component is static). For example, a video player component may provide an alternate light-weight version to be used while dragging and resizing the component. Such version may use (for example) lower resolution, lower frame rate or repeated display of a small video section so as to more easily display while being dragged and resized.

The component may also provide information related to the layout and organization of the component. Such information may include (for example) minimal or maximal component size, a white-list of allowed layout parameterized-behavior elements etc.

Component definitions may also include specific hints which direct the dynamic layout process involving this component (as described in US Patent Publication No.

2013-0219263 entitled "WEB SITE DESIGN SYSTEM INTEGRATING DYNAMIC LAYOUT AND DYNAMIC CONTENT" published 22 Aug. 2013, and issued as U.S. Pat. No. 10,185,703 on Jan. 22, 2019, incorporated herein by reference and assigned to the common assignee of the current invention) or specific guidelines used to create special editing handles for the given component which affect any dynamic layout behavior and the operation of dynamic layout rules when the component is edited (as described in described in US Patent Publication No. 2013-0232403 entitled "METHOD AND SYSTEM FOR THE USE OF ADJUSTMENT HANDLES TO FACILITATE DYNAMIC LAYOUT EDITING" published 5 Sep. 2013, and issued as U.S. Pat. No. 10,169,307 on Jan. 1, 2019, incorporated herein by reference and assigned to the common assignee of the current invention).

As discussed herein above, there are different phases to the processes of system 200. At the component definition stage, WBS vendor staff 161 (and often designer 262) may define and create some standard parameterized-behavior elements using component/container editor 233 including specifying which parameterized-behavior element types may be overridden and under which conditions. It will be appreciated that anyone defining a component (vendor 261/designer 262) may also define container components (including the parameterized-behavior elements they would like to override within their contained components) under associated conditions and possibly specific parameter values.

Site designer 162 may use these components and containers to design his website at the page definition phase. He may also modify any pre-specified overrides or possibly specify his own parameters using editing behavior applier 232. It will be appreciated that system 200 may allow him to have additional abilities such as specifying his own overriding requests for components inside containers or the ability to totally edit all parts of components and containers.

It will be appreciated that editing behavior applier 232 may apply the various object editing operations, typically affected using a mouse, a keyboard or both (as well as any other user interface input means). These may include selection, dragging, dropping, resize, copy, paste, etc. as discussed in application US Patent Publication No. 2018/0032626.

It will be appreciated that a site designer 262 may work using WYSIWYG (what you see is what you get). Thus, a page may be interactively resolved and displayed while being edited. However, the pertinent website page may also be modified at runtime due to changes to databases in CMS 250 (the underlying database) or in external sources which are displayed via repeater containers (which reflect these database changes, e.g. show added or deleted records).

As discussed herein above, a component may accept parameters which can specify, add or modify any of the SBL elements, such as the parameterized-behavior elements described above. Furthermore, the parameterized-behavior elements may accept their own parameters such as "modify all contained components with a color modifier which dampens the colors by X %".

Extended element handler 210 may handle all functionality regarding the parameterized-behavior elements. For example, site designer 162 (at runtime) may select a component (otherwise known as a user selected component) using component selector 231 and apply the required behavior using editing behavior applier 232. It will be appreciated that the application by editing behavior applier 232 may change one or many parameters of the parameterized-behavior elements of the selected components.

It will be appreciated that element handler 210 may be triggered both by WBS runtime server 240 (before a page may be loaded or refreshed) or by WBS editor 230 when an editing change is made to a current component during an editing session (thereby causing a full or partial refresh, or directly causing an override request).

Request receiver 211 may receive an overriding request (during page loading/refresh/rendering, from a user editing request or from an automatic system request as a result of a change from external sources 270/CMS 250). Resolver 212 may identify which components are affected within the related containment levels (based on selection rules and conditions specified by the requesting component) and the result of page analyzer 260 and may receive from data handler 16 (from each component) which parameterized behavior-elements are overridable. As discussed herein above, page analyzer 260 may determine the complete component hierarchy. This could involve detecting semantic composites (as discussed herein above) which may have elements subject to overriding and which may be part of the hierarchy. Thus, the complete hierarchy may be based on predefined containers, repeater containers (defined based on data sources) and semantic composites (defined based on page analysis).

Negotiator 213 may implement a communication request based on a negotiation protocol with each of the identified components based on the output of resolver 212 (including procedural negotiations such as using variables and decision logic) to communicate with the relevant parameterized-behavior element(s) of the selected component to determine contained component overriding. The protocol may be considered a form of communication between 2 components A and B1, in order to determine (for example) if a parameter X from a component A can be applied to component B1.

Resolver 212 may also handle conflict resolution. For example, a contained component which handles formatting may override elements of its container based on the data presented to it. The container, on the other hand, may be trying to override elements of the contained component. Thus, a loop or conflict may be created and resolved by the resolver 212 (through determining which overriding request to ignore and thereby breaking the loop).

As discussed herein above, some parameterized-behavior elements may be pre-defined as overridable and some not. If according to the protocol, overriding is permissible, resolver 212 may implement the override.

Thus resolver 212 may apply component changes based on rules which generally flow along the container hierarchy, though they may have effects which cross hierarchy boundaries. It will be appreciated that resolver 212 is typically part of a complete run made while converting the website building system database structure to HTML (or otherwise preparing it for display), but may also re-run due to triggers. It may be a standalone phase, or integrated into the full conversion phase.

Based on this analysis and the determined component hierarchy, resolver 212 may traverse the page hierarchy to determine all overriding requests made by various overriding components. It will be appreciated that an overriding request may involve applying a parameterized-behavior element, but may also be a simple attribute override ("set color to green") which does not involve a parameterized-behavior element.

Figure 9:
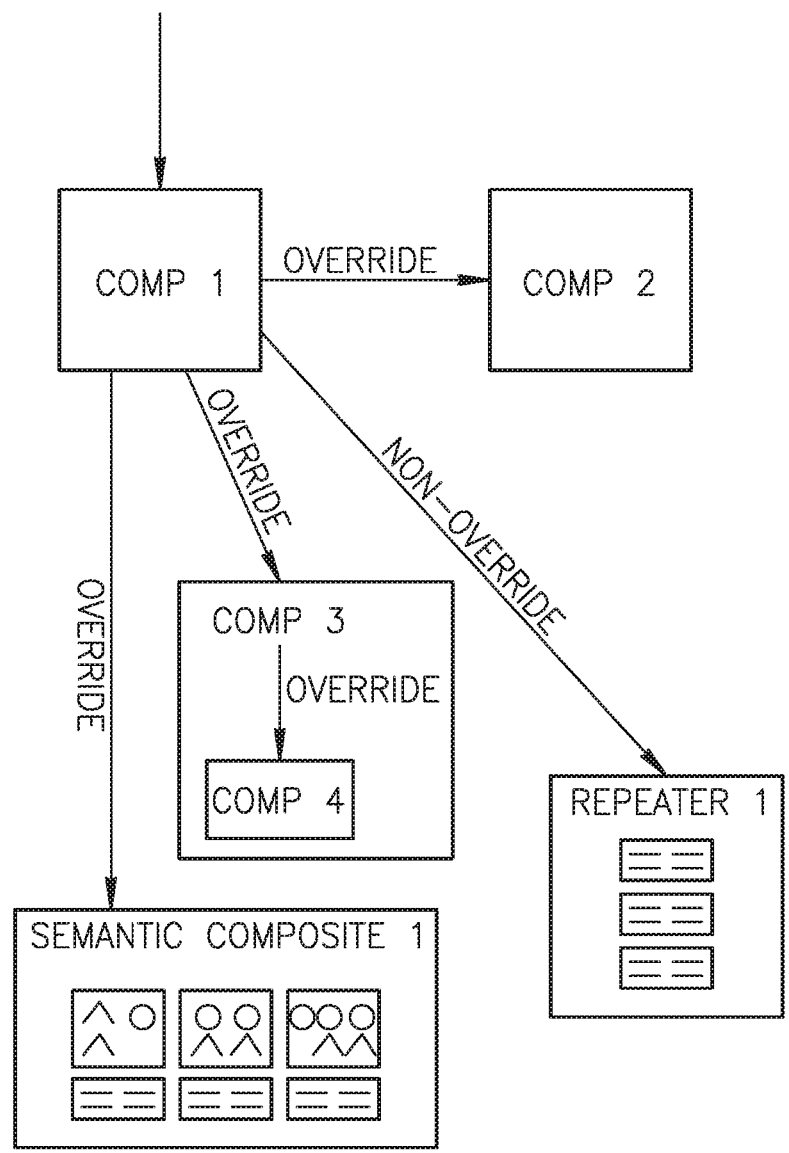
FIG. 9 is a schematic illustration of an exemplary flow of overrides within a hierarchy of components, constructed and operative in accordance with the present invention.

It will be appreciated that resolver 212 may determine the list of all overriding requests and any matching components i.e. the components to which the overriding requests should be applied. Resolver 212 may also receive the response of each matching component to each override request applicable to it, as determined by the matching component's own white list/black list or other matching component-specific rules governing an override request. Reference is now made to FIG. 9 which illustrates an exemplary flow of overrides that may occur within a hierarchy of components. For example, a component (comp1) may override the relevant parameterized behavior elements of a series of components in the same container as comp1 or contained in it (such as components 2, 3 and semantic composite 1 but not repeater 1). It may also override comp4 even though it is in a different containment level (i.e. inside comp3).

Resolver 212 may also determine the order in which override request should be applied. This could be based on user specified order (e.g. an overriding component providing multiple override requests and specifying their order or priority) or based on system rules (similar to the specificity rules governing the order in which CSS rules are applied).

Resolver 212 may then apply the overriding requests according to the determined order to all matched components. It will be appreciated that applying an override request to a specific matching component may affect the way the affected component interacts with other components (due to conditions evaluation returning different results). For example if component A affects component B, the change to component B may cause situations in which B affects component C or is affected by component D to be resolved differently. This could be, for example, due to specialized rules for component B (as part of its override data handler 16) which may cause some or all changes to component B to initiate further overriding of other components by component B. It will be appreciated that such overriding rules may cause a "chain reaction" effect amongst components and may also cause "overriding circles" which may be detected and resolved by resolver 212.

In an extended embodiment, both overriding components and matching components may provide code snippets which can interact and negotiate with each other to determine if overriding should occur. The snippets could be created using a regular programming language (e.g. JavaScript) or a limited script language adapted to such negotiations. Either way, negotiator 213 may execute such code snippets in a sandbox or other enclosed execution environment.

It will be appreciated that in general, parameterized behavior element overrides (including resolving and negotiating) typically occur during the page rendering stage i.e. when a page is edited or refreshed (at editing and at runtime).

It will be appreciated the extended element handler 210 may be integrated with the part of system 200 that processes the website building system CMS 250 definitions and produces the output to the user. This could be the physical rendering to the screen (e.g. using a specialized client application), or creating an HTML version of the site. It will be appreciated that final resolution and rendering may be performed by WBS editor 230 (for editing purposes) and run time server 220 or by the user's browser or a combination of them.

In another embodiment, the browser may re-activate the website building system-to-HTML process to re-create some or the entire rendered page due to triggers occurring (possibly including user interactions). This may also occur based on operational code (JS) in the page which acts based on various triggers.

Triggers can include various events like these described as dynamic layout triggers (data change, site edits from another user, server notifications) as well as operational triggers of the page itself (user interaction, JS operation).

It will be appreciated that the negotiation protocol via negotiator 213 may be implemented across rendering boundaries (e.g., different iFrames, different browser windows, different machines for server-rendered third-party applications).

It will also be appreciated that updates to the components are not stored in CMS 250 as they are part of the dynamic page resolution i.e. performed at the preview stage (during editing) or at runtime. It will be further appreciated that resolution must be performed at runtime/preview since the component itself may change further during runtime due to (for example) dynamic layout triggers as well as component logic. It will be further appreciated that such changes may further affect the overriding process such as changing the result of a geometry/content analysis. For example, if component A (via a parameterized behavior element) changes an attribute X of a component B (which then creates a version 2 of component B, with the updated value of attribute X), component B is not stored in CMS 250 with the new value of attribute X as the change may affect component B the next time it is used. If (for example) the next time component B is used, component A may not override component B and the original value of attribute X would be lost. One exception may be the storage of a cached version of a page having component B with the new value of attribute X for quick rendering.

As discussed herein above, a parent component or page may set (or specify) properties of predefined components contained inside a parent component using invocation line parameters or an associated style sheet which includes rules setting specific properties. Such specifying may also include some overriding. For example, a component may have a predefined default color, and this specifying may override the default color. This may also apply to system-specific attributes. For example, a component may have a default or built-in layout parameterized-behavior element, and the invoking component may specify an alternative layout parameterized-behavior element.

A component may also explicitly override attributes of managed components provided to the component by its parent, e.g.:

```
Homepage:
<gallery id="gallery1">
    <grid id="grid1"> ... </grid>
    <Image src={image1} />
    <Image src={image2} />
</gallery>
Gallery component:
<div id="div1">
    <nav-btn id="nav1"> [PREV] </nav-btn>
    <nav-btn id="nav2"> [NEXT] </nav-btn>
    <div id="div2">{this.props.children.map(child =>
    child.toVdom({color:'green'}))}</div>
</div1>
```

In the example above, the gallery component (gallery1) is a container component, and receives 3 children (grid1, image1, image2) as managed components. Inside div2, the gallery component overrides the CSS 'color' attribute for the received child components, setting it to green. This may be relevant to the grid1 child (which probably has a background color), but not to the image children (image1, image2, which may not have a background color definition at all). It will be appreciated that such overriding is not applied to the predefined button components nav1 and nav2.

As discussed herein above, element handler 210 may also apply parameterized-behavior element types (such as layout) to managed elements (contained components). This may be done, for example, by making a call such as "child.toVdom({-display: Carousel})" when defining the component. It will be appreciated that in the example above, such overriding may be relevant to the grid component managed element (grid1), but not to the image component managed elements.

Another example may use a format such as "child.toVdom({display: 'block'})" to override a specific layout parameterized-behavior element parameter (i.e. image display method) when relevant.

In a system based on E-HTML/CSS page specification, such overriding may also be achieved through a specific style which can be referenced though an inline class reference or class addition function, e.g.:

| Gallery component: |
|---|
| \<style\> <br> .set-carousel { --display: Carousel; } <br> \</style\> <br> ... <br> \<div id="div1"\> <br>     \<nav-btn id="nav1"\> [PREV] \</nav-btn\> <br>     \<nav-btn id="nav2"\> [NEXT] \</nav-btn\> <br>     \<div id="div2" class="set-carousel"\>    // $1^{st}$ option <br>         {children} <br>     \</div\> <br>     \<div id="div3"\>    // $2^{nd}$ option <br>         {this.props.children.map(child =\> <br>         child.AddClass("set-carousel"))} <br>     \</div\> <br> \</div1\> |

As discussed herein above, WBS vendor 261/website designer 262 may set limitations on the ability of components to set or override specific attributes of their predefined elements (i.e. sub-components), their managed elements (i.e. contained children) or both using WBS editor 230. A typical implementation may restrict property settings or overriding to external layout and style properties, and may not allow setting, overriding or modifying of other element properties (including the element's content in particular).

As discussed here above, the functionality of system 200 may include specialized handling of managed elements (i.e. components in a container).

For example, when a container component X is handed a list of managed elements (A1 . . . An), for inclusion/display, container component X may transform the managed elements in a number of ways before displaying them based (for example) on X's type, the parameters of the specific X instance or the parameters and attributes of the managed elements. Such transformations may include changing the order of display and setting specific locations or positions, e.g. display elements arranged vertically, but justifying every odd item to the right and every even item to the left (also known as zigzag display). This could also be based on managed element attributes, content or structure, e.g. justify managed elements to the right or left side, starting at the top, based on their brightness being above or below a given value.

Other transformations may include changing (overriding) attributes of the managed elements, e.g. overriding their color, border setting etc., omitting elements, e.g. only display a subset of the provided managed elements, or only show a specific 10-element "window" of the full and much larger list, extending elements, e.g. providing managed elements which are themselves containers with specific or additional managed elements and duplicating or repeating elements, e.g. displaying a managed element twice, possibly overriding some attributes in the displayed managed elements so as to differentiate between the different duplicates of a specific managed element. This could be used, for example, to display multiple variants for selection.

It will be appreciated that E-HTML/CSS-based embodiments of system 200 may also allow the definition of extendable style sheets, which may provide a pathway or API though which elements of a component can be modified from the outside of the component. This can be used, for example, for parameterized-behavior elements or regular attribute overriding and can also extend to CSS (by adding extra parameterized-behavior elements to a component).

A typical definition has the following form (e.g. used inside the definition of a gallery component):

| Inside the definition of \<Gallery\>: |
|---|
| \<style\> <br> .mylayouter { <br>     @extend;    // Class can be customized from <br>                    outside of the component using CSS <br>     --Grid-prop-gutter:3; <br>     --Grid-prop-cols:5; <br>     color: blue; <br> } <br> \</style\> <br> \<render\> <br>     \<div\> <br>         \<Grid class="mylayouter" id="grid1"\> <br>             \<div\> ... \</div\> <br>             \<div\> ... \</div\> <br>         \</Grid\> <br>         \<Grid id="grid2"\> <br>             \<div\> ... \</div\> <br>             \<div\> ... \</div\> <br>         \</Grid\> <br>     \</div\> <br> \</render\> |

It will be appreciated that the E-CSS definition and use of a layout parameterized-behavior element type above may define a set of extendable and overrideable layout properties that may be applied to the instance of this component (i.e. grid1 inside the gallery definition), including the setting of the gutter, columns and color properties of grid1.

It may also define a "layout parameterized-behavior element type" above a custom pseudo element that can be customized or overridden from an external component which uses the gallery component.

The "@extend" statement above informs system 200 that this style sheet may be extended or overridden by parent components. The list of properties defined in the style sheet containing "@extend" functions as a white list of properties which may be overridden. Furthermore, the style sheet itself may be extended by adding additional properties. It will be appreciated that the values specified in the style-sheet for the different attributes (e.g. gutter=3 above) serve as the default values when a parent component does not specify a value for the specific attribute.

In an alternative embodiment, system 200 may use a directive format similar to other system-specific CSS attributes (e.g. "-public: true") instead of "@extend" directive.

In this scenario, other properties of grid1, or the properties of grid2, are not "open" or a part of the gallery component's exposed interface. As discussed herein above, except for potential explicit overriding of properties through the @extend-based API, other properties of the gallery component, custom or predefined would not be inherited from containing components so as to preserve the component's integrity.

The use of wild-card property specification above refers to all properties starting with the prefix "prop-gallery-*". System 200 may support other wild-card specifications as well (including specification of CSS properties according to their property group, color-related, background-related, etc.). It will be appreciated that the specification may also refer to regular CSS properties (not extended ones) as per the reference to 'color' above.

As discussed herein above, resolver 212 may further implement a white/black listing according to "who can override" (i.e. which "parent" components may override the exposed properties) rather than "what can be overridden". As discussed herein above, the information may be provided by data handler 16 and may be based on various parameters and properties of the parent component, such as its component type, name, screen region or other attributes (e.g. what layout parameterized-behavior element type it uses). The syntax for such specification may be, for example:

```
@extend override_from=(gallery, grid*,...), exclude=(...)
Or
@extend override_from=(property=value,...), exclude=(...)
```

Regarding invocation, a component or page which includes (as owner) the gallery component described above may use the exposed properties as parameters, e.g.:

```
<Gallery cols=4>
...
</Gallery>
```

This can be done using any of the methods described above. The number of columns (4) specified in the invocation parameter would override the default value of 5. Such overriding or specifying can only be applied to directly owned components (e.g. the gallery in the example above). The overriding may apply to indirectly owned components in cases involving shared root components.

As discussed herein above system 200 may support smart containers, i.e. the container definition may include editor interactions, special handles and editing and runtime behaviors.

Component/container editor 233 may also allow for the creation of smart containers and may further interface with a specific editing driver 15A which may be associated with the smart container type.

It will be appreciated that smart containers may manage their contained components and may interact with them via resolver 212 to provide a set of behaviors not found in regular containers.

In particular, the container may define specific limitations or rules on component types or other parameters. For example, an album container may allow only image components to be included in it, or only image and video components, or only images below a given size and a specialized container may transform polymorphic components included in it, e.g. convert all contained galleries into slider-type galleries.

The container may dictate the style of its contained components. This may be done, for example, via a set of settings and attributes which can be applied to the components. These may include presentation elements (e.g. color, bevel) as well as functional elements active WBS 230 (e.g. added handles which allow specific manipulations).

It will be further appreciated that the container may define different settings for different contained component types (e.g. make all contained galleries yellow and all contained text boxes wide and green).

The container may determine the way in which the contained components are arranged inside it (for example a gallery, accordion, book format or another) and may also impose specific behavior on sub-component layout inside it, e.g. affecting dragging and resizing inside it (e.g. require snap to grid or certain arrangements). The container may also determine the handling of dynamic layout inside the container, which may be different from the default dynamic layout handling methods used for regular containers. It will be appreciated that dynamic layout handling may be based on dynamic layout hints as described herein above. It will be appreciated that functionality as described herein above may be defined through editor behavior driver 15A and runtime behavior driver 15B.

It will be also appreciated that the above mentioned functionality may depend on the contained component type, component content, component age, component editing history, component inheritance history, component size, component shape, component z-order, component use within the application, component formatting information, component native reading order, inter-page component association, user-defined hints and any combination thereof. Some of these component attributes are further discussed in US Patent Publication No. 2013-0086496 entitled "Adaptive User Interface Creation in Multimedia Creative Design System" published 4 Apr. 2013, incorporated herein by reference and assigned to the common assignee of the current invention.

A smart container may also interact with WBS editor 230 to provide WBS editor 230 with a container-specific driver and logic (via editor behavior driver 15A). Such a driver may control aspects of the editing behavior. Such aspects are separate from any container runtime behavior but may affect the final container and component presentation.

One such aspect is the dragging behavior of components inside the editor during editing. Possible behaviors may include VBox (vertical box) behavior, all dragging is snapped to a vertical line. Components may be auto aligned on the line, e.g. centered or left aligned. Another such aspect is slider behavior when the dragging becomes non-continuous and moves between discrete slider positions, and may cause the slider to slide/scroll the content in order to enable placing of the dragged component in "un-seen" positions.

Another such aspect is the drag and drop behavior. For example, a text editing box may be implemented as a smart container which positions dropped components so that they integrate into the flow of the text already typed into the text editing box, instead of using the exact drop position.

As another example, a 3D container type may add 3D manipulation handles and 3D behaviors to contained components. The container may provide WBS editor 230 with the relevant logic and UI elements to support such 3D behavior. WBS editor 230 may add the new handle types and new handles, control contained component resizing and moving and control the order in which various editing actions are executed.

Figure 10:
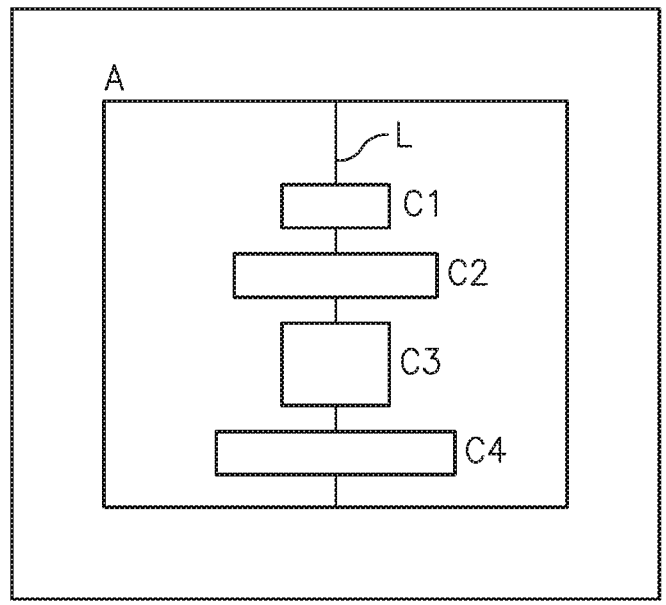
FIG. 10 is a schematic illustration of a configuration for a vertical alignment line in a VBox smart container, constructed and operative in accordance with the present invention.

The container may allow designer 262 to define some parameters controlling the editing and runtime behavior of the container, possibly overriding some existing component attributes. For example, as is illustrated in FIG. 10 to which reference is now made, a VBox container A may define a default behavior in which the (vertical) line L to which the contained components C1 to C4 are aligned, is at the center of the container. The container may allow the user to override this parameter, and specify a different position for the vertical line L by specifying an absolute or percentage-based position R for the line L.

As another example of the above, a runtime modifiable smart container may allow components residing in it to be moved or resized during run-time (as specified by runtime behavior handler 15B). A Vbox version of such a smart container may enforce alignment of the moved contained components to a vertical line in the container as described above.

In yet another example, a Vbox container when arranging its contained components along a vertical line, will place controls between these child components which call the visual editor's "add component in place" function.

Figure 11:
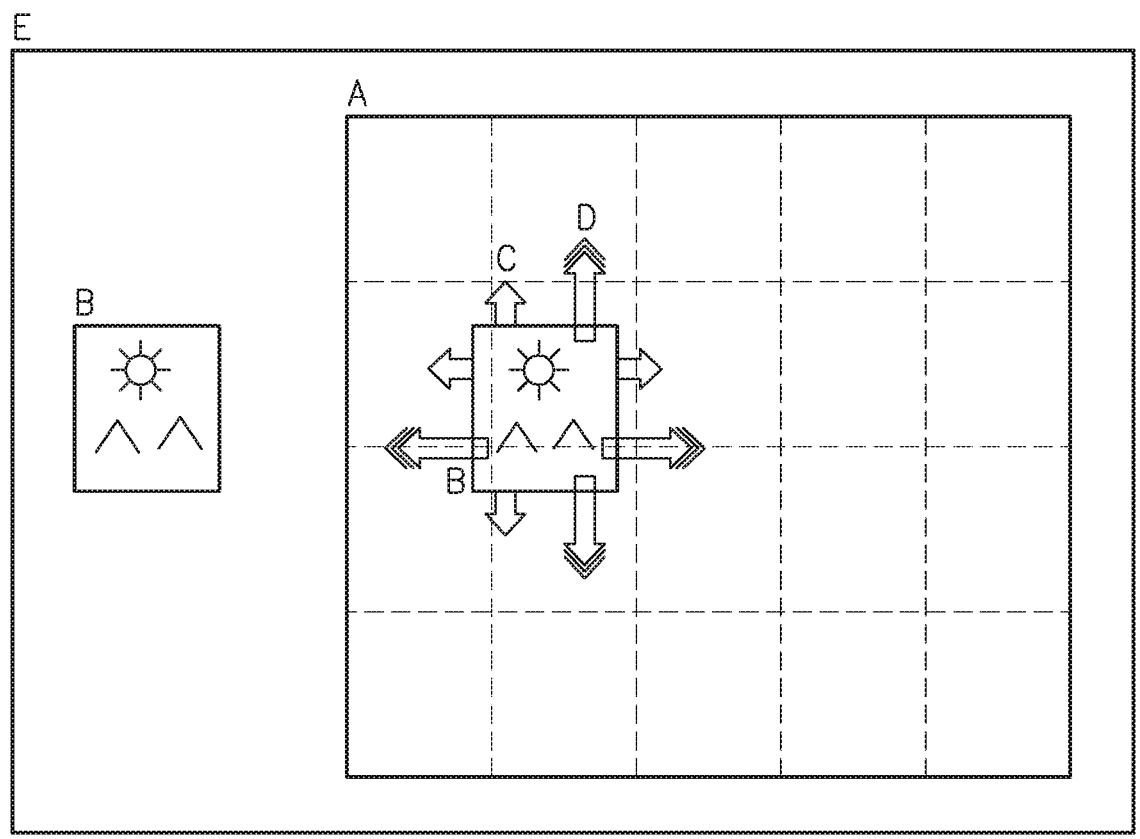
FIG. 11 is a schematic illustration of a special container component which manages moving, resizing and additional handles for contained components, constructed and operative in accordance with the present invention.

In yet another example (as shown in FIG. 11 to which reference is now made), a smart container component A may include the ability to define an internal layout (e.g. by dividing the special container into X by Y equal rectangles). In the specific example, A is divided into 4×5 rectangles.

Components placed into the smart container A (such as the illustrated image component B) would "grow" multiple resize handles on each edge, e.g. handles [C] and [D] on the top edge (with similar handle pair on each of the 4 edges of component B).

Smart container A may further implement additional code (operative with website building system visual stage area E) which causes resizing via handle [C] to snap to A's internal grid and resizing via handle [D] not to snap to A's internal grip. Additional examples of such different behavior and handle types are detailed in U.S. Pat. No. 10,169,307, including behaviors which affect dynamic layout parameters and rules.

It will be appreciated that instead of actual visual handles, WBS editor 230 may implement "invisible" handle regions which provide the specific functionality when the mouse interacts with them. WBS editor 230 may notify the user when he is engaging such invisible handle, e.g. by changing the mouse pointer shape.

System 200 may support containers which place the elements inside them not based on pre-defined locations, but rather according to visual optimization of the placement of the elements (e.g. using component placement rules).

The dragging implementation (for example) may be based on editor behavior driver 15A interfacing with WBS editor 230 and the smart container driver provided by the container Y. For example:

WBS editor 230 gets a mouse move for a component X.

WBS editor 230 may send the event description (the mouse move) to the editor behavior driver 15A of the container Y containing component X.

Editor behavior driver 15A may handle the mouse move information and the existing X's layout information object to produce a modified layout information object;

Editor behavior driver 15A updates WBS editor 230 and the container Y with the new information.

Thus, editor behavior driver 15A may work within WBS editor 230, translating user interactions to property updates. These interactions may include drag, click, etc. They can be higher level (e.g. "component dropped") or lower level actions (tracking each mouse position update). The driver may be monolithic or may consist of a generic driver with a component specific driver integrated into the generic part.

It will be appreciated that in some embodiments, some of the interaction between editor behavior driver 15A and WBS editor 230 may pass via resolver 212. For example a new component may be added to a container and the new component may send parameterized behavior element parameters of its own.

It will be appreciated that other (non-container) components may also comprise editor behavior driver 15A. For example, a label component may comprise an editor behavior driver 15A which supports specific variants of in-place editing.

As another example, a picture display component may provide a region-of-interest based processing during editing of display images. Under such a scheme, system 200 may define a region of interest in a display image (e.g. a given object in the image). Such a definition may be based on user input, image content analysis of other factors. Once a region-of-interest is defined, system 200 may modify the image positioning and cropping when the image is resized (while editing) in order to focus on the visible region on the image's region-of-interest. Thus, the new combination of positing and cropping may provide the best focus on the region-of-interest for the new zoom factor.

It will also be appreciated that system 200 may implement recommending modifications to containers providing AI/machine learning based modification or layout recommendations for their contained components through AI/Machine learner 214. It will be appreciated that the functioning of AI/Machine learner 214 may be similar to that described in U.S. Pat. No. 9,747,258, which discusses recommending design alternatives and applies the same principles for AI-based recommendations, recommending overrides and parameters in addition to complete layouts.

Such recommended modifications may include just layout (e.g. selecting position and size), limited attribute sets (e.g. container which provide specific background images/video to the sub-containers inside them, or just affect color selections etc.), behavior or any specific contained component sub-elements.

This may be done for the contained components inside a single container (with page section, page and page sets being "higher container levels") or for a set of containers (for example a number of separate page sections handled together so as to provide color matching between them).

As discussed herein above, WBS vendor 161 and designer 162 may define components with instructions on how the attributes may be modified using component/container editor 233.

AI/Machine learner 214 may use this information gathered for WBS vendor 161/designer 162 and other users (including editing history and BI, other websites etc. stored in CMS 250) on what constitutes a good design, color matching etc. AI/Machine learner 214 may classify relevant users and sites according to their attributes (business type and sub-type, geography, user experience, system features used, etc.).

AI/Machine learner 214 may analyze this input material, which may include a large amount of editing changes (from the editing history) and applications of parameterized-behavior elements, as well as information about popularity and ranking of the analyzed sites, pages and components. This input material may be used to train a machine learning engine (such as a neural-network based engine) which may then provide a modification recommendation. The current state of the machine-learning engine may be kept in ML/AI repository 2510.

Such recommending containers may be mixed with other (regular) containers subject to the relevant privacy and intellectual property laws (such as copyright and trademark laws) governing use of such information and ensuring that privacy of the data belonging to other users is not compromised.

As discussed in US Patent Publication No. 2018/0032626, changes to the structure of the website components may affect indexing of the website by search engine spiders and therefore may affect search engine optimization. It will be appreciated that system 200 may also comprise a search engine friendly renderer to send information about updated containers and components to be indexed to a search engine spider as discussed in U.S. Pat. No. 9,436,765 entitled "SYSTEM FOR DEEP LINKING AND SEARCH ENGINE SUPPORT FOR WEB SITES INTEGRATING THIRD PARTY APPLICATION AND COMPONENTS" issued 6 Sep. 2016 and incorporated herein by reference and assigned to the common assignee of the current invention.

Thus, parameterized-behavior elements may be used to automatically transform the visual and operational parameters of components and containers within all containment levels based on overriding protocols.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a server, a client, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer or a client/server configuration selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description above. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A website building system, the system comprising:
a processor;
at least one database storing extended website components and their associated component hierarchies, said extended website components having parameterized-behavior elements, wherein said parameterized-behavior elements represent style, body and operational logic of said extended website components;
wherein at least one said extended website component has an associated override data handler running on said processor;
an element handler running on said processor to receive a communication request implementing an override request for said parameterized-behavior elements sent from a second component to a first component to implement style, behavioral and operational changes;
said element handler to communicate with said associated override data handler of said first component to determine that said override request is related to an overridable parameter of a parameterized-behavior element of said first component, said associated override data handler of said first component having its associated override rules according to at least one of: semantic type and business information (BI); and
said element handler to communicate with said associated override data handler of said first component and to negotiate the implementation of said communication request based on a negotiation protocol that utilizes variables and decision logic to resolve override conflicts, said element handler applying said negotiation protocol to determine that at least one parameter of a contained component of said first component within said associated component hierarchy can be overridden and to apply said parameterized-behavior element of said second component to said first component.

2. The system according to claim 1 and also comprising a runtime server to activate said element handler for said first component for a current view.

3. The system according to claim 2 and also comprising a WBS (website building system) editor with knowledge of parameterized behavior elements to enable a user to select a first component and apply an editing change to said selected first component.

4. The system according to claim 1 and wherein said first component is at least one of predefined, repeater and a semantic composite.

5. The system according to claim 3 and also comprising a page analyzer to determine said component hierarchy for said first component and to determine that said first component is a semantic composite.

6. The system according to claim 5 wherein said element handler comprises at least one of:
a request receiver to receive said first component and said override request from at least one of: said WBS editor as a result of said editing change and said runtime server as a result of a change to said first component due to a change from an external source;

a component resolver to receive from said override data handler of said first component which parameterized-behavior elements of said first component are overridable, to apply said override request changes accordingly and to resolve override conflicts between said first component and said second component within said hierarchy.

7. The system according to claim 6 and also comprising an artificial intelligence/machine learner to perform artificial intelligence and machine learning analysis based on user activity and analysis of other websites and pages to recommend modification overrides for said website components based on said analysis of other web sites and pages.

8. The system according to claim 3 wherein said WBS editor comprises:
a component editor to enable a user to create and define said override rules for parameterized-behavior elements of a website component;
a component selector to enable a user to select a first component; and
an editing behavior applier to apply an editing request to said selected first component.

9. The system according to claim 8 wherein said editing request comprises at least one of: selecting, dragging, dropping, resizing, copying, pasting and attribute modification.

10. The system according to claim 3 wherein said web site components also comprise at least one of:
an editor behavior driver to affect the representation and editing process of said first component by said WBS editor;
a runtime behavior driver to affect how said first component is handled by said runtime server at runtime; and
a component rendering function to provide rendering instructions for said first component for said WBS editor and said runtime server.

11. A method for a website building system, the method comprising:
storing extended website components and their associated component hierarchies, said extended website components having parameterized-behavior elements, wherein said parameterized-behavior elements represent style, body and operational logic of said extended website components;
wherein at least one said extended website component has an associated override data handler;
receiving a communication request implementing an override request for said parameterized-behavior elements sent from a second component to a first component to implement style, behavioral and operational changes, said receiving a communication request comprising:
communicating with said associated override data handler of said first component to determine that said override request is related to an overridable parameter of a parameterized-behavior element of said first component, said associated override data handler of said first component having its associated override rules according to at least one of: semantic type and business information (BI);
communicating with said associated override data handler of said first component to negotiate the implementation of said communication request based on a negotiation protocol that utilizes variables and decision logic to resolve override conflicts, said communicating comprising:
applying said negotiation protocol to determine that at least one parameter of a contained component of said first component within said associated component hierarchy can be overridden; and
applying said parameterized-behavior element of said second component to said first component.

12. The method according to claim 11 and also comprising activating said receiving a communication request for said first component for a current view.

13. The method according to claim 12 and also comprising enabling a user to select a first component and apply an editing change to said selected first component during an editing session.

14. The method according to claim 11 and wherein said first component is at least one of predefined, repeater and a semantic composite.

15. The method according to claim 12 and also comprising determining said component hierarchy for said first component and determining that said first component is a semantic composite.

16. The method according to claim 13 wherein said receiving a communication request further comprises at least one of:
receiving said first component and said override request from at least one of: said editing change and said activating said receiving a communication request as a result of a change to said first component due to an external source;
receiving from said override data handler of said first component which parameterized-behavior elements of said first component are overridable, applying said override request changes accordingly and resolving override conflicts between said first component and said second component within said hierarchy.

17. The method according to claim 16 and also comprising performing artificial intelligence and machine learning analysis based on user activity and analysis of other websites and pages and recommending modification overrides for said website components based on said analysis of other websites and pages.

18. The method according to claim 13 wherein said enabling a user to select a component and apply an editing change comprises:
enabling a user to create and define said override rules for parameterized-behavior elements of a website component;
enabling a user to select a first component; and
applying an editing request to said selected first component.

19. The method according to claim 18 wherein said editing request comprises at least one of: selecting, dragging, dropping, resizing, copying, pasting and attribute modification.

* * * * *